(12) United States Patent
Lee

(10) Patent No.: US 10,185,157 B2
(45) Date of Patent: Jan. 22, 2019

(54) GLASSES STRUCTURE

(71) Applicant: HIGH RAINBOW ENT, CO., LTD., Tainan (TW)

(72) Inventor: Hsing-Jen Lee, Tainan (TW)

(73) Assignee: High Rainbow Ent, Co., Ltd., Tainan (TW)

( * ) Notice: Subject to any disclaimer, the term of this patent is extended or adjusted under 35 U.S.C. 154(b) by 0 days.

(21) Appl. No.: 15/446,598

(22) Filed: Mar. 1, 2017

(65) Prior Publication Data

US 2017/0176769 A1 Jun. 22, 2017

Related U.S. Application Data

(63) Continuation-in-part of application No. 15/085,478, filed on Mar. 30, 2016.

(30) Foreign Application Priority Data

Mar. 31, 2015 (TW) .............................. 104110575 A

(51) Int. Cl.
*G02C 5/12* (2006.01)

(52) U.S. Cl.
CPC .................................. *G02C 5/126* (2013.01)

(58) Field of Classification Search
CPC ...................................................... G02C 5/136
USPC ..................................................... 351/80, 138
See application file for complete search history.

(56) References Cited

U.S. PATENT DOCUMENTS 7,524,055 B2 * 4/2009 Schepke ................. G02C 1/04
351/103

* cited by examiner

*Primary Examiner* — Darryl J Collins
(74) *Attorney, Agent, or Firm* — Wang Law Firm, Inc.

(57) ABSTRACT

A glasses structure is provided. A nose pad of the glasses structure includes a bendable device and a nose pad body covering the bendable device, wherein the nose pad body and the bendable device have a coupling device disposed on respective ends thereof. The coupling device of the nose pad body and the coupling device of the bendable device cooperatively constitute a coupling structure. A glasses frame of the glasses structure has a lens insertion trench on one side thereof, and the glasses frame has a containing trench which is connected to the lens insertion trench. The coupling device of the nose pad is detachably coupled to the containing trench of the glasses frame. At least a lens is inserted into the lens insertion trench and leans against the coupling structure in the containing trench to confine the coupling structure.

10 Claims, 9 Drawing Sheets

GLASSES STRUCTURE

CROSS-REFERENCE TO RELATED APPLICATION

This application is a continuation-in-part of U.S. patent application Ser. No. 15/085,478, filed on Mar. 30, 2016, and claims priority to Taiwan Patent Application No. 104110575, filed on Mar. 31, 2015, in the Taiwan Intellectual Property Office, the content of which are hereby incorporated by reference in their entirety for all purposes.

BACKGROUND OF THE INVENTION

1. Field of the Invention

The present invention generally relates to a nose pad, in particular to a glasses structure which can be fixed on the glasses frame without any locking elements.

2. Description of the Related Art

Conventionally, the glasses frame is designed to have a recess in the middle part, and a nose pad can be placed therein, so that the nose pad is fixed to the inner side of the glasses frame with screws. However, the structure described above is lacking in a better fastness, resulting in that the nose pad may detach from the glasses frame due to external forces from collisions. Besides, in the long run, user abuse, humidity or sunlight might take its toll on the integrity of the locking structure. As a result, the nose pad is incapable of being firmly fixed on the glasses frame.

SUMMARY OF THE INVENTION

In view of the aforementioned obstacle to the prior art, the objective of the present disclosure is to provide a glasses structure which aims at resolving the current shortcomings concerning that the conventional glasses frame and the glasses structure have to be fixed to each other by using locking elements to achieve robustness.

The glasses structure provided in the present disclosure includes a nose pad, a glasses frame and a lens. The nose pad is disposed with a bendable device and a nose pad body covering the bendable device, wherein the nose pad body has a first coupling device on a top end thereof, and the bendable device has a second coupling device on a top end thereof. The first and second coupling devices cooperatively constitute a coupling structure on a top center end of the nose pad. The glasses frame is disposed with a lens insertion trench on one side thereof, and a middle part of the glasses frame is disposed with a containing trench which is connected to the lens insertion trench, wherein the coupling structure of the nose pad is detachably coupled to the containing trench of the glasses frame, wherein a front side of the coupling structure is entirely contained in the containing trench. The lens is inserted into the lens insertion trench of the glasses frame and leans against the coupling structure of the nose pad in the containing trench which is connected to the lens insertion trench, so as to confine the coupling structure of the nose pad. The lens has a back side, a front side opposite to the back side, and a circular side connecting the back side and the front side, wherein the lens is inserted into the lens insertion trench, and one end on the front side of the lens leans against a portion of the coupling structure of the nose pad, so as to confine the coupling structure of the nose pad Preferably, a left end and a right end of the coupling structure of the nose pad are respectively disposed with an extended protrusion and the end on the front side of the lens leans against a back side of the extended protrusion of the coupling structure.

Preferably, the extended protrusion is the bendable device or is made of the material of the bendable device and the nose pad body.

Preferably, a shape of the nose pad body corresponds to the bendable device of the nose pad.

Preferably, the containing trench of the glasses frame is further disposed with one or a plurality of protruding cylinders, and the coupling structure of the nose pad body of the nose pad is disposed with one or a plurality of fixing holes corresponding to the one or the plurality of protruding cylinders.

Preferably, the shape of the coupling structure of the nose pad corresponds to the shape of the containing trench of the glasses frame.

Preferably, the bendable device of the nose pad is made of a metal.

Preferably, the nose pad body of the nose pad is made of a soft material.

Preferably, two sides of the middle part of the glasses frame are respectively disposed with a recess and the recess connects to the lens insertion trench and the containing trench of the glasses frame.

Preferably, the bendable device of the nose pad is made of a bendable metal, so that user adjusts the angle of the nose pad body of the nose pad for his/her own comfort.

Preferably, the bendable device of the nose pad is covered by the nose pad body using injection molding method.

As mentioned previously, a glasses structure of the present disclosure may have the following advantages.

1. The nose pad body of the nose pad of the present disclosure covers the bendable device, and the bendable device is made of a metal. Hence, user can adjust the angle of the nose pad to match the face for his/her own comfort.

2. The coupling structure of the nose pad of the present disclosure is detachably coupled to the containing trench of the glasses frame, and the lens is inserted into the lens insertion trench and leans against the coupling structure of the nose pad in the containing trench to confine the coupling structure of the nose pad. Consequently, the nose pad of the present disclosure can be coupled to the glasses frame without any locking elements, rendering the coupling mechanism hassle-free.

DETAILED DESCRIPTION OF THE PREFERRED EMBODIMENTS

Figure 1:
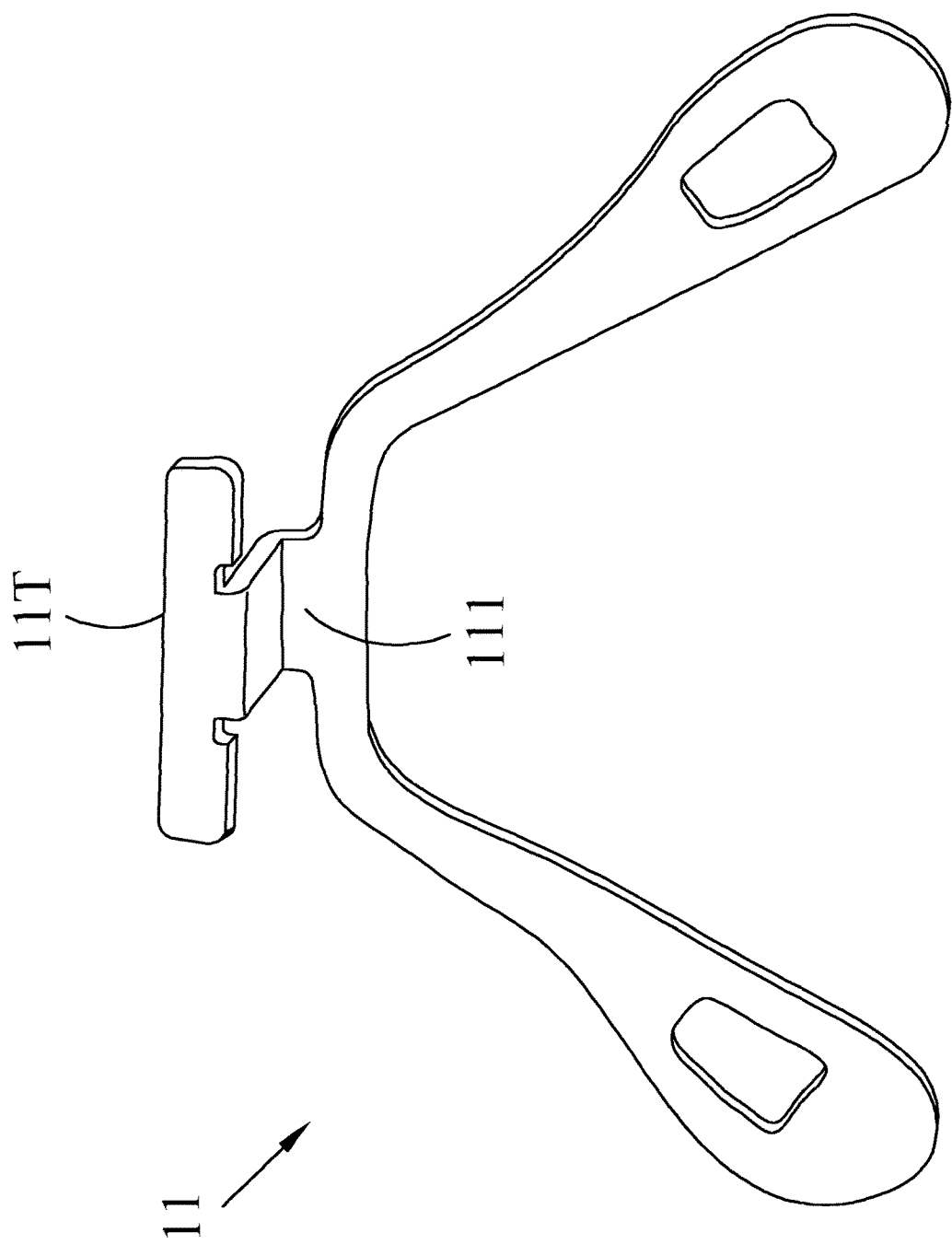
FIG. 1 is a schematic diagram of the bendable device of the nose pad of the glasses structure of the present disclosure.
Figure 2:
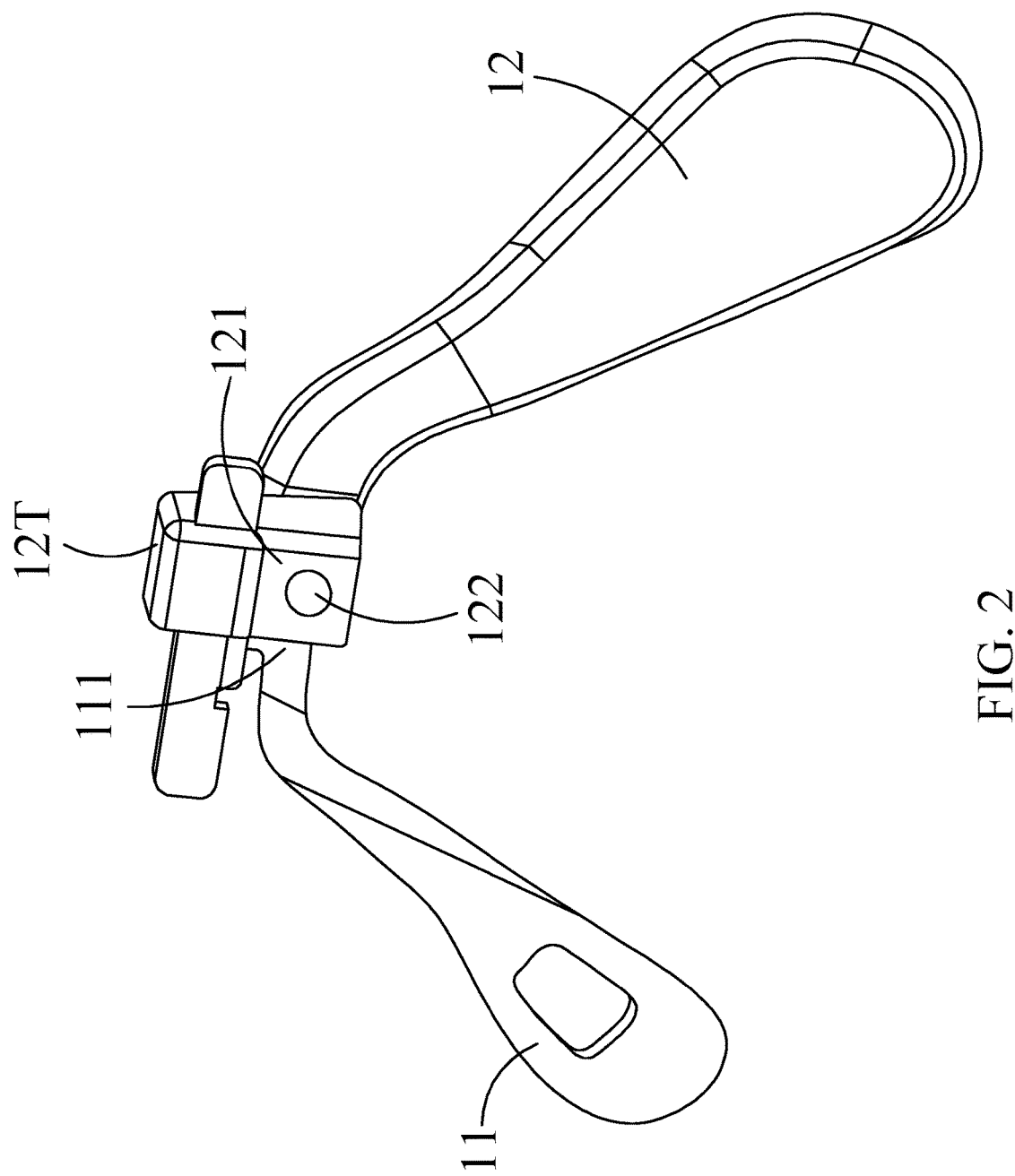
FIG. 2 is a schematic diagram of the nose pad body of the glasses structure of the present disclosure with part of the bendable device covered.
Figure 3:
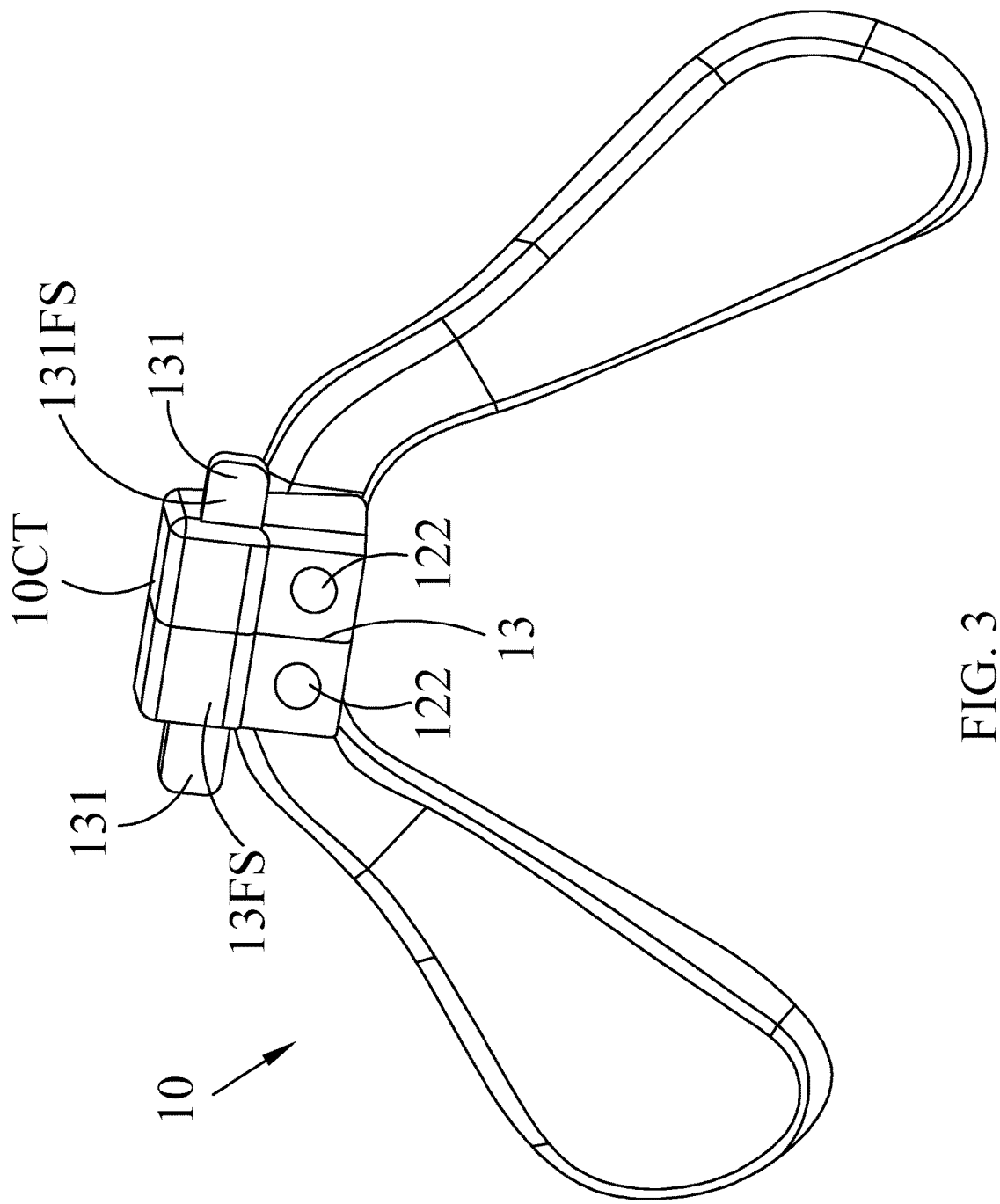
FIG. 3 is a schematic diagram of the nose pad body of the glasses structure of the present disclosure.
Figure 4:
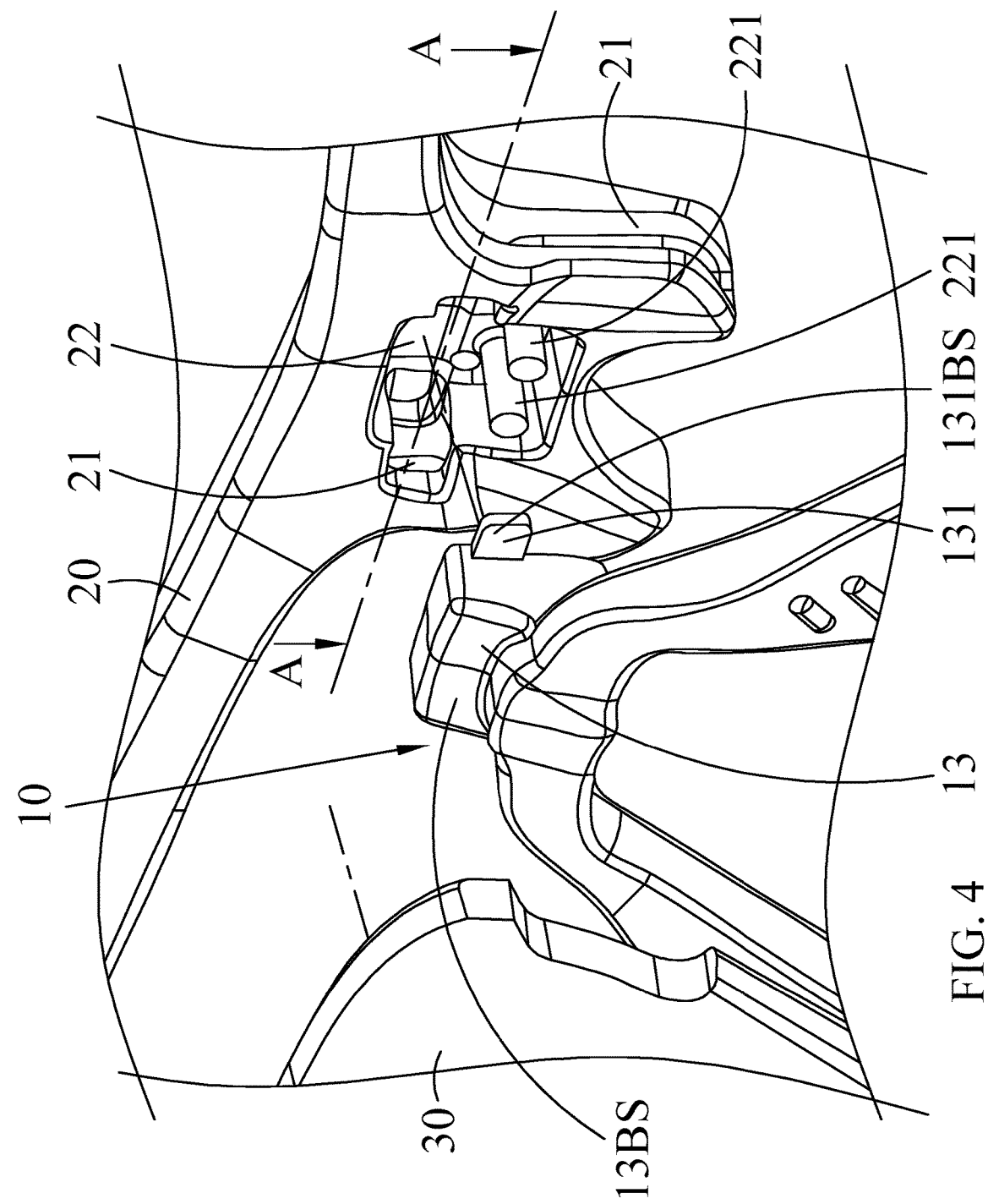
FIG. 4 is a schematic diagram of the nose pad, glasses frame and lens of the glasses structure of the present disclosure.
Figure 5:
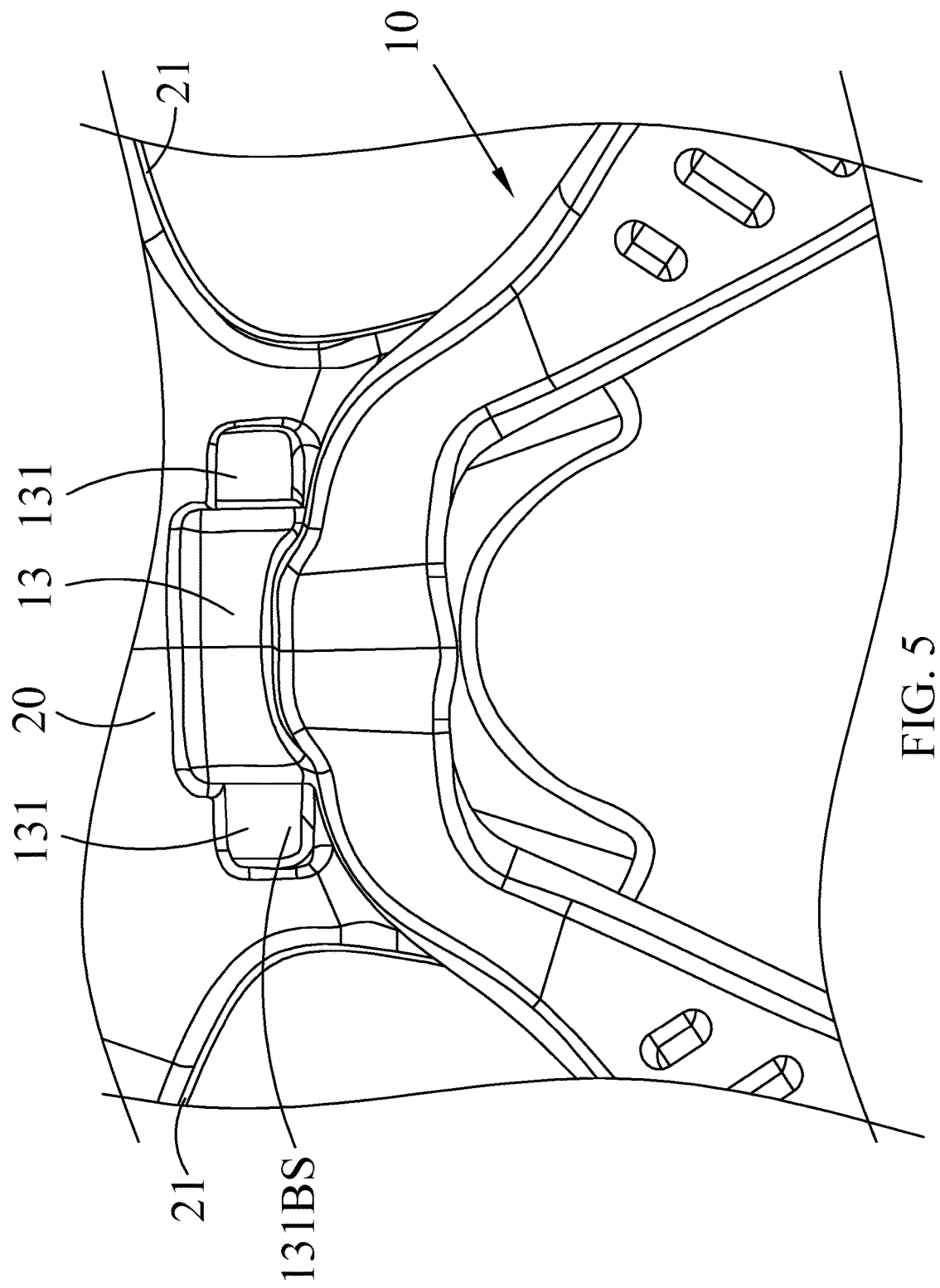
FIG. 5 is a schematic diagram of the glasses structure of the present disclosure illustrating the coupling structure of the nose pad being placed in the containing trench of the glasses frame.
Figure 6:
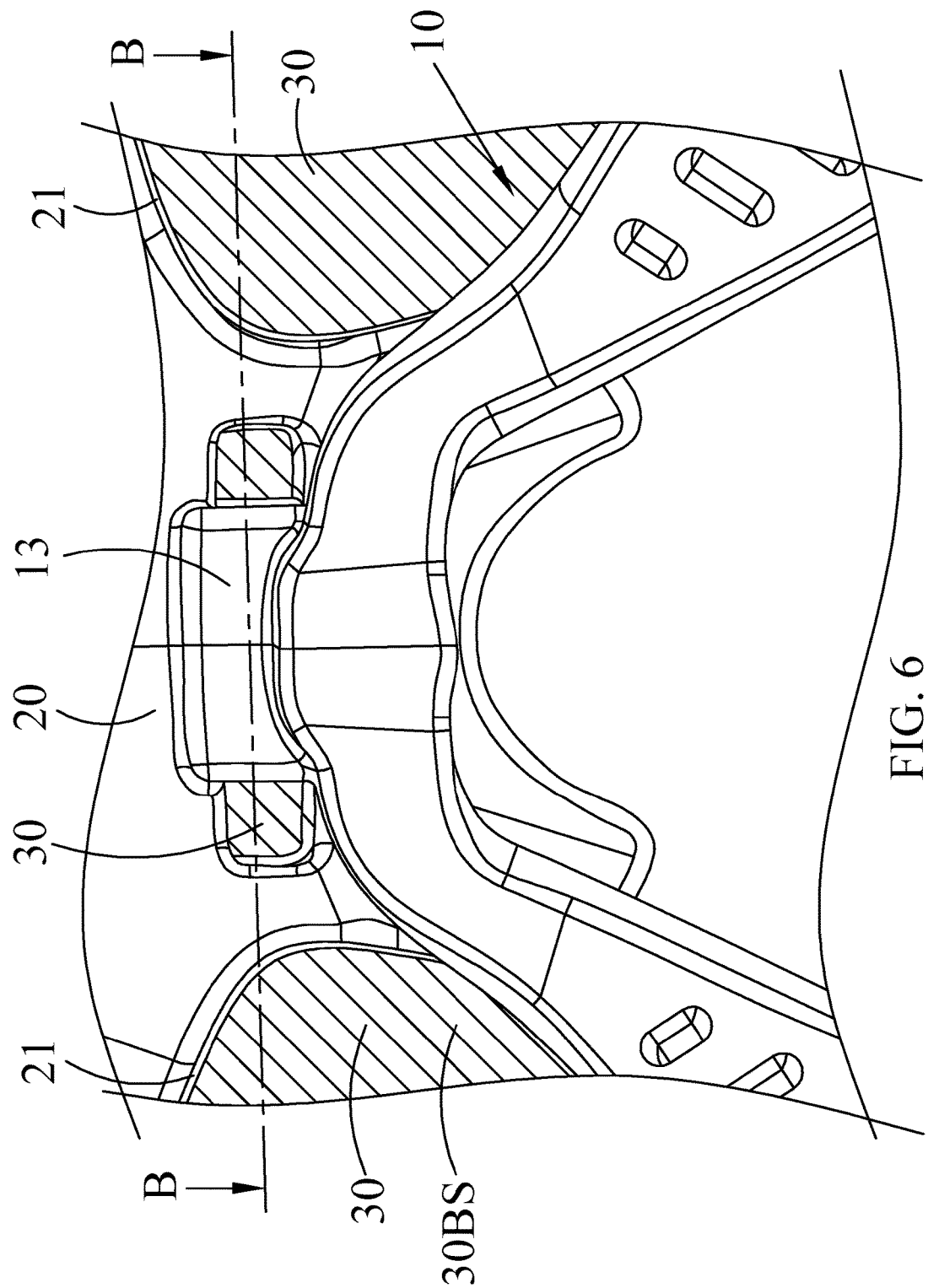
FIG. 6 is a partial schematic diagram illustrating the lens leaning against the coupling structure of the nose pad in the containing trench in accordance with the glasses structure of the present disclosure.

Referring to FIG. 1 through FIG. 6 together, a glasses structure is provided, which includes a nose pad 10, a glasses frame 20 and a lens 30. The nose pad 10 is disposed with a bendable device 11 (shown in FIG. 1) and a nose pad body 12 covering the bendable device 11 (shown in FIGS. 2 and 3). The nose pad body 12 and the bendable device 11 of the nose pad 10 have a coupling device 111, 121 disposed on respective ends thereof. The end may be respective top ends 12T, 11T of the nose pad body 12 and the bendable device 11 of the nose pad 10. A coupling device 121 of the nose pad body 12 and a coupling device 111 of the bendable device 11 of the nose pad 10 cooperatively constitute a coupling structure 13, and the coupling structure may be formed on a top center end 10CT of the nose pad 10. Here, the bendable device 11 may be made of a metal, and the nose pad body 12 may be made of a soft material. Here, the soft material may be a plastic material or silicone gel. The shape of the nose pad body 12 of the nose pad 10 corresponds to that of the bendable device 11 of the nose pad 10. It is noted that FIG. 3 depicts the front side 13FS of the coupling structure 13, the front side 13FS of the coupling structure 13 is facing to the containing trench 22, and the back side 13BS of the coupling structure 13 is depicted in FIG. 4.

In addition, one side of the glasses frame 20 of the present disclosure is disposed with a lens insertion trench 21, and a middle part of the glasses frame 20 is disposed with a containing trench 22 which is connected to the lens insertion trench 21. Here, the coupling structure 13 of the nose pad 10 is detachably coupled to the containing trench 22 of the glasses frame 20, and the shape of the coupling structure 13 of the nose pad 10 corresponds to that of the containing trench 22 of the glasses frame 20. Specifically, a front side 13FS of the coupling structure 13 is able to be entirely contained in the containing trench 22, such that allowing the lens 30 passing through the lens insertion trench 21 to confine coupling structure 13 of the nose pad 10. The containing trench 22 of the glasses frame 20 may further be disposed with one or a plurality of protruding cylinders 221. The coupling device 121 of the nose pad body 12 of the nose pad 10 may be disposed with one or a plurality of fixing holes 122 thereon, and each fixing hole 122 corresponds to each protruding cylinder 221 disposed on the containing trench 22 of the glasses frame 20, thereby providing a better fixing mechanism.

Moreover, the lens 30 of the present disclosure has a back side 30BS, a front side 30FS opposite to the back side 30BS, and a circular side connecting the back side 30BS and the front side 30FS. The lens 30 is inserted into the lens insertion trench 21 of the glasses frame 20, and the lens 30 leans against the coupling structure 13 of the nose pad 10 in the containing trench 22 which is connected to the lens insertion trench 21 to confine the coupling structure 13 of the nose pad 10. Besides, two ends (such as a left end and a right end) of the coupling structure 13 of the nose pad 10 of the present disclosure are disposed with an extended protrusion 131, respectively, and the lens 30 leans against the extended protrusion 131 of the nose pad 10, wherein the extended protrusion 131 has a front side 131FS and a back side 131BS. Here, the extended protrusion 131 may be the bendable device 11 or may be made of the material of bendable device 11 and the nose pad body 12. The extended protrusion 131 of the present disclosure applies the material of the bendable device 11 as an exemplary embodiment (shown in FIG. 3).

As can be further appreciated in FIG. 4 through FIG. 6, FIG. 8, and FIG. 9 again, the temple and earpiece of the glasses structures of the present disclosure are not illustrated herein, for the purpose of succinctness. When assembling the nose pad 10 to the glasses frame 20, the user is capable of coupling the coupling structure 13 of the nose pad 10 to the containing trench 22 of the glasses frame 20 without any locking elements and tools. When the coupling structure 13 of the nose pad 10 is coupled to the containing trench 22 of the glasses frame 20 by the user, one surface of the coupling structure 13 of the nose pad 10 leans against one surface of the containing trench 22 in the middle part of the glasses frame 20, and the fixing hole 122 disposed on the coupling device 121 of the nose pad body 12 of the nose pad 10 corresponds to the protruding cylinder 221 of the containing trench 22 of the glasses frame 20, so as to provide a better fixing mechanism. The mechanism aforementioned will not affect the coupling mechanism between the coupling structure 13 of the nose pad 10 and the containing trench 22 of the glasses frame 20. Afterwards, the user couples the lens 30 to the lens insertion trench 21 of the glasses frame 20, and one end on the front side 30FS of the lens 30 leans against a portion (i.e. the back side 131BS of the extended protrusion 131) of the coupling structure 13 of the nose pad 10 in the containing trench 22 which is connected to the lens insertion trench 21, so as to confine the coupling structure 13 of the nose pad 10 in the containing trench 22 of the glasses frame 20 (shown in FIG. 6). The lens mentioned herein may be a bifocal lens, so that the robustness of the glasses structure of the present disclosure is promoted to avoid the nose pad detaching from the glasses frame. Here, the nose pad body 12 of the nose pad 10 of the present disclosure may cover the bendable device 11 by injection molding method. The bendable device 11 may be made of a bendable metal. Consequently, the user can conveniently adjust the angle of the nose pad 10 to match the facial curvature for the user's comfort.

Figure 7:
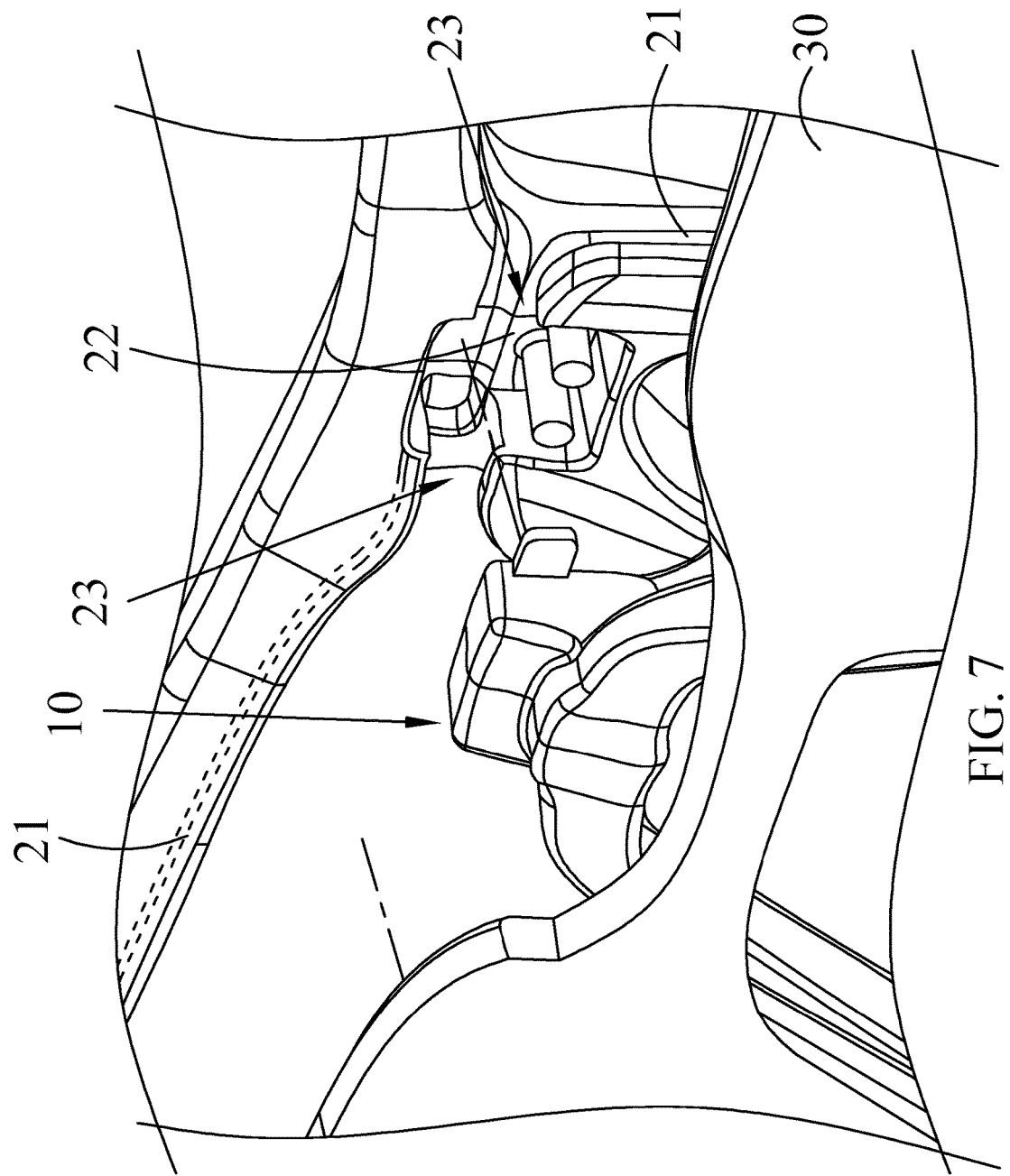
FIG. 7 is another schematic diagram of the nose pad, glasses frame and lens of the glasses structure of the present disclosure.
Figure 8:
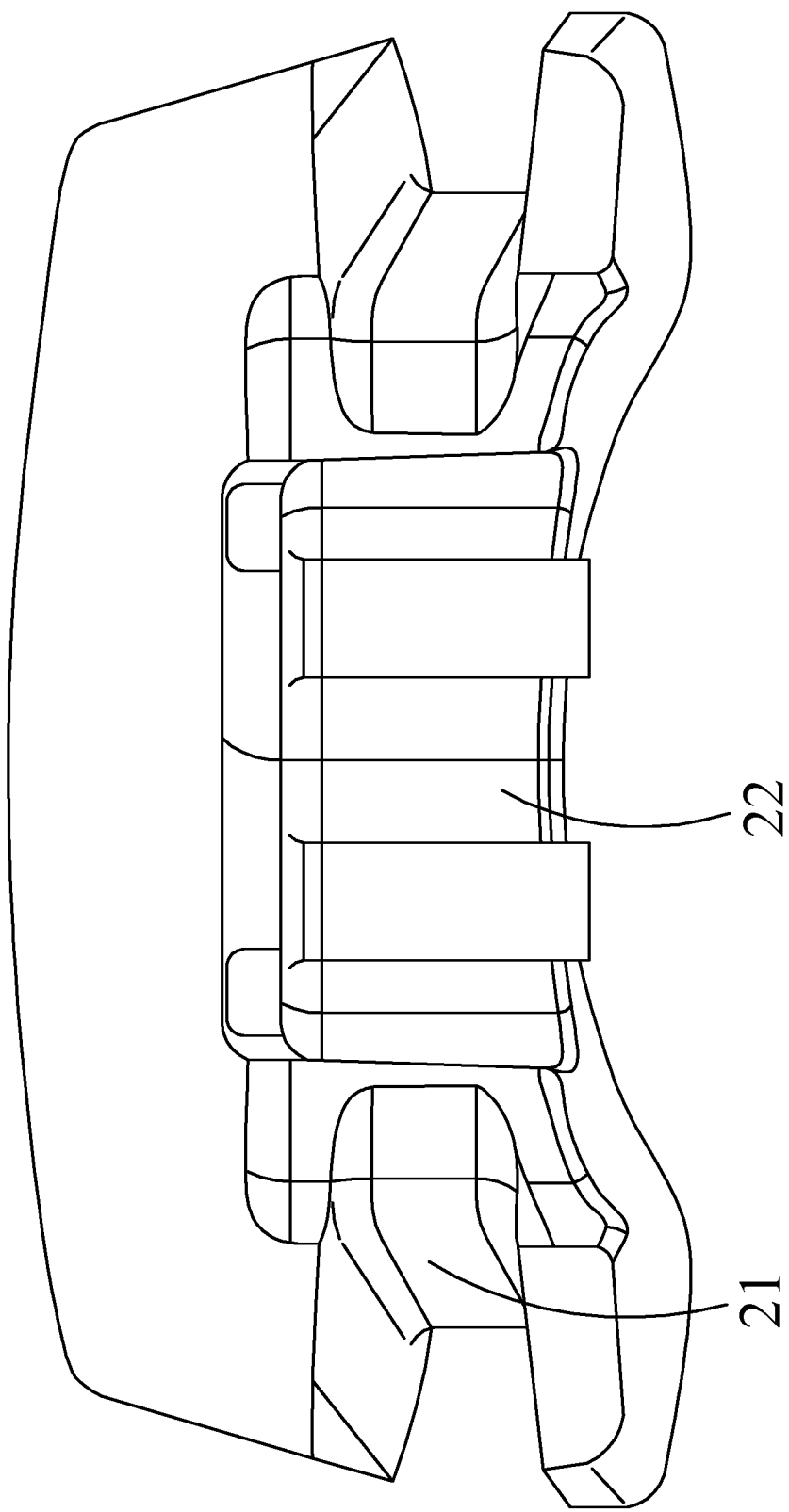
FIG. 8 is a schematic sectional diagram of the glass frame of the present disclosure along with the section line AA.
Figure 9:
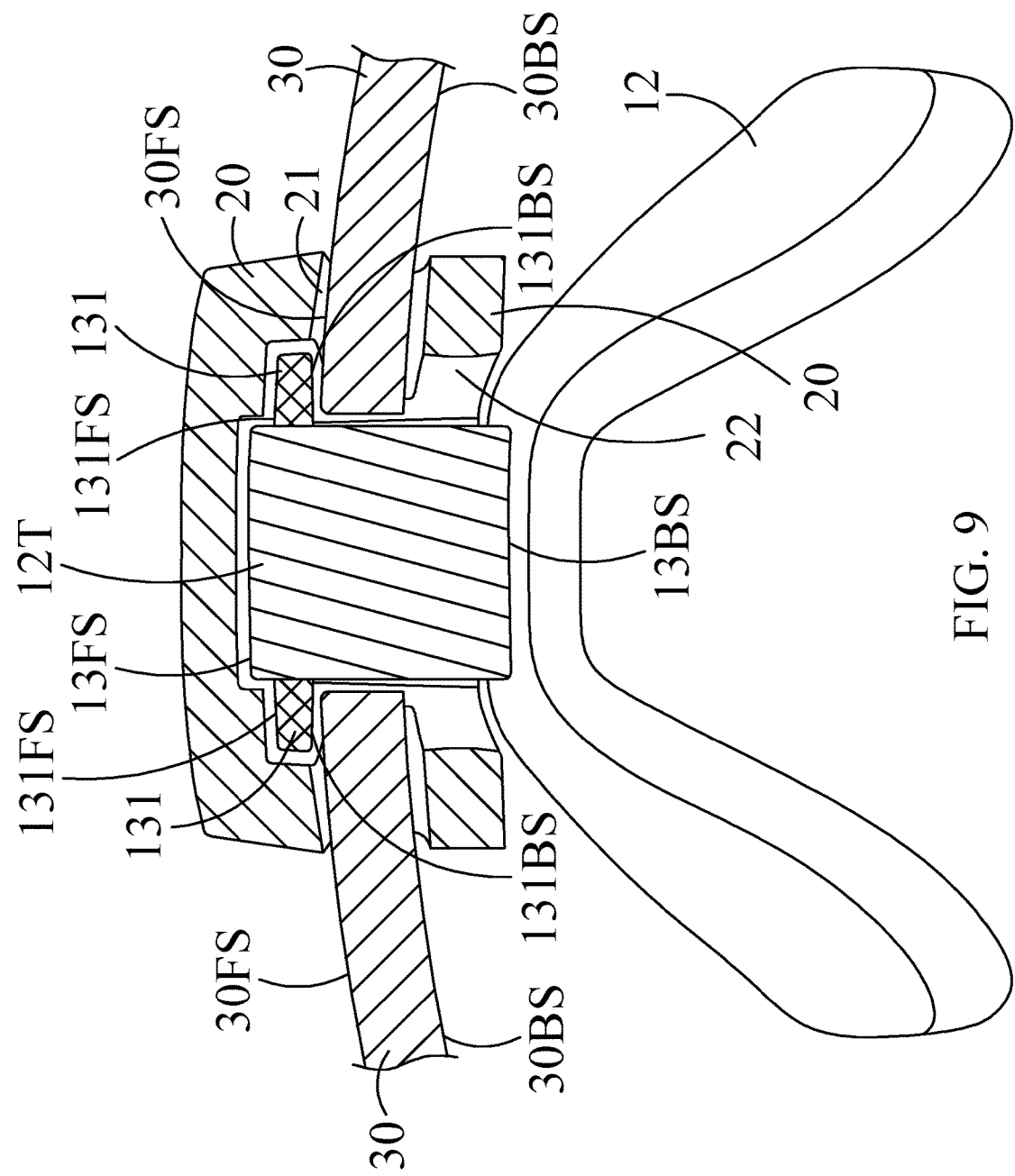
FIG. 9 is a schematic sectional diagram of the glass structure of the present disclosure along with the section line BB.

Referring to FIG. 7 again, two sides of the middle part of the glasses frame 20 are disposed with a recess 23, respectively. The recess 23 is connected to the lens insertion trench 21 and the containing trench 22 of the glasses frame 20, facilitating the user to sequentially couple the coupling structure 13 of the nose pad 10 and the lens 30 to the containing trench 22 of the glasses frame 20. Here, the lens 30 may be a single vision lens. For example, the single vision lens is constituted by connecting two lenses via a connecting part, and the connecting part is coupled to the containing trench 22 through the recess 23.

In conclusion, the nose pad of the glasses structure of the present embodiment is capable of being coupled to the containing trench of the glasses frame without any locking elements. Besides, the user can adjust the nose pad to fit in with the facial curvature. As a consequence, the glasses structure of the present embodiment enhances both wearing convenience and comfort.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A glasses structure, comprising:
   a nose pad disposed with a bendable device and a nose pad body covering the bendable device, the nose pad body has a first coupling device on a top end thereof, and the bendable device has a second coupling device on a top end thereof, such that the first and second coupling devices constitute a coupling structure cooperatively on a top center end of the nose pad;
   a glasses frame with a side disposed with a lens insertion trench and a middle part disposed with a containing trench connected to the lens insertion trench, the coupling structure of the nose pad being detachably coupled to the containing trench of the glasses frame without any locking elements and tools, wherein a front side of the coupling structure is entirely contained in the containing trench; and
   at least a lens inserted into the lens insertion trench of the glasses frame, the lens leaning against the coupling structure of the nose pad in the containing trench connected to the lens insertion trench so as to confine the coupling structure of the nose pad;
   wherein the lens has a back side, a front side opposite to the back side thereof, and a circular side connecting the back side and the front side, wherein the lens is inserted into the lens insertion trench, and one end on the front side of the lens leans against a portion of the coupling structure of the nose pad, so as to confine the coupling structure of the nose pad,
   wherein a left end and a right end of the coupling structure of the nose pad are respectively disposed with an extended protrusion and the one end on the front side of the lens leans against a back side of the extended protrusion of the coupling structure.

2. The glasses structure of claim 1, wherein the extended protrusion is the bendable device or is made of a material of the bendable device or the nose pad body.

3. The glasses structure of claim 1, wherein a shape of the nose pad body of the nose pad corresponds to the bendable device of the nose pad.

4. The glasses structure of claim 1, wherein the containing trench of the glasses frame is further disposed with one or a plurality of protruding cylinders and the coupling structure of the nose pad body of the nose pad is disposed with one or a plurality of fixing holes corresponding to the one or the plurality of protruding cylinders.

5. The glasses structure of claim 1, wherein a shape of the coupling structure of the nose pad corresponds to a shape of the containing trench of the glasses frame.

6. The glasses structure of claim 1, wherein the bendable device of the nose pad is made of metal.

7. The glasses structure of claim 1, wherein the nose pad body of the nose pad is made of a soft material.

8. The glasses structure of claim 1, wherein two sides of the middle part of the glasses frame are respectively disposed with a recess and the recess connects to the lens insertion trench and the containing trench of the glasses frame.

9. The glasses structure of claim 1, wherein the bendable device of the nose pad is made of a bendable metal, so that user adjusts an angle of the nose pad body of the nose pad for his/her own comfort.

10. The glasses structure of claim 1, wherein the bendable device of the nose pad is covered by the nose pad body using injection molding method.

* * * * *